Feb. 1, 1966
G. P. TOUEY ETAL
3,232,805
METHOD OF MAKING TOBACCO SMOKE FILTERS
FROM CRIMPED THERMOPLASTIC TOWS
Filed July 15, 1959
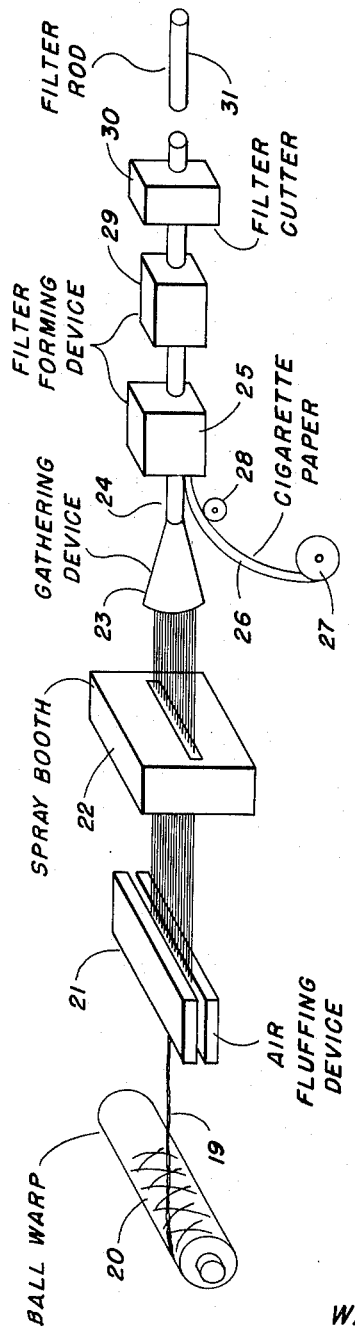
GEORGE P. TOUEY
WAYNE V. McCONNELL
INVENTOR.
BY R. Frank Smith
Harold N. Powell
ATTORNEYS

United States Patent Office 3,232,805
Patented Feb. 1, 1966

3,232,805
METHOD OF MAKING TOBACCO SMOKE FILTERS FROM CRIMPED THERMOPLASTIC TOWS
George P. Touey, and Wayne V. McConnell, Kingsport, Tenn., assignors to Eastman Kodak Company, Rochester, N.Y., a corporation of New Jersey
Filed July 15, 1959, Ser. No. 827,164
5 Claims. (Cl. 156—180)

This invention relates to a method of bonding for use in producing a firm or rigid tobacco smoke filter from crimped tows and the resultant improved product. In particular, this invention relates to the formation of rigid filter rods from a crimped tow of a plurality of filaments by spraying the tow with a polymerizable, high-boiling, organic liquid containing unsaturated groupings in its structure.

A wide variety of materials have been disclosed for the preparation of cigarette filters. Thus, such fibers as cotton, wool and several of the synthetics have been described for this purpose. However, all have certain disadvantages. One major disadvantage has been the difficulty in imparting firmness to fiber type filters by a method that can be readily carried out on modern high speed filter making machines. The need for firmness in a filter rod has been well established in the art. It aids in the cutting of the rod into the ultimate filter tip and it is desirable to the smoker. Also, it does not become loose and distorted during the normal manipulations encountered in smoking.

It has been suggested that firmness or rigidity in textile fiber type filters may be produced by the application of various adhesives to the fibers. The adhesive has been added dry or dissolved or dispersed in volatile solvents. Certain patents illustrate the addition of a dry adhesive in the form of a thermoplastic fiber. The bond is then obtained by heating the filter to the point where the thermoplastic fiber melts or becomes tacky. In addition to using a dry adhesive, certain patents also mention that the adhesive can be dissolved in a volatile organic solvent.

Although certain of the prior methods are capable of producing firm filter rods from textile fibers, they are difficult to carry out commercially. Thus, the addition of a solid type adhesive in the form of a thermoplastic fiber to the filter will not produce a bond unless the finished filter is heated to the softening point of the fiber. This demands a carefully controlled curing step at high temperatures. Too much will fuse the filter into a nonporous mass and too little heat will have no bonding effect whatsoever. Also, it may be difficult and expensive to blend the heat sensitive fibers with the other components of the filter in a satisfactory manner.

The addition of an adhesive dissolved in a volatile solvent to a textile type of filter has several obvious objections. If an organic solvent is employed a solvent recovery system must be installed to make the process practical. Also, it may be difficult to remove the last traces of the solvent during the curing step. This leads to odors in the filter. Other objections to adhesives containing volatile solvents are the danger from explosions and the possible undesirable working conditions on the part of the operator of the equipment.

Adhesives containing water as the solvent also have several disadvantages when they are used as bonding agents for textile fiber type filters. This is particularly true when the textile material is a crimped tow form. In general when a water solution is sprayed on this type of material it makes it "limp" and destroys the crimp. Also, water based adhesives render the tow tacky and unless the tow is dried before it is converted to a filter it will adhere to the various parts of the filter rod-making machine during fabrication of the filter. A drying step would slow down the filter rod production considerably. In addition, water soluble adhesives may dissolve in the smoker's mouth.

In order to avoid the problems encountered with bonding agents discussed above, a new type of filter bonding agent has gained widespread usage by the filter industry. This has been the liquid plasticizer type of bonding agent described in the Crawford and Stevens Patents 2,794,239 and 2,794,480. It is nontacky and requires no solvent. When sprayed on the tow, any excess spray is recoverable from the spray booth. By this it is meant that the portion of the plasticizer spray which does not touch the tow during the filter rod fabrication will flow down the walls of the spray cabinet into a suitable container. Thus, it can be reused, whereas a solvent based adhesive forms a build-up of solids on the walls of the spray cabinet.

Although the liquid plasticizer type of bonding agent eliminates the serious drawbacks of other types of materials which have been proposed for textile tow filters, its use on certain filaments presents problems. That is, plasticizers will only completely function with those textile tows which are Solvated or partially Solvated by the plasticizer. While it bonds a cellulose acetate tow in an excellent manner, it is less effective with tows made from fibers less compatible with plasticizers. Thus, for example, it is less effective with tows prepared from certain commercial polyester fibers, viscose fibers, and the polyolefin fibers, the latter being described in the Touey, Mumpower companion U.S. application 664,157 of which the present application is a continuation-in-part now Patent No. 2,966,157.

After extended investigation, we have found an improved method of bonding tobacco smoke filters which has wide application on various filaments and which gives improved filter products.

One object of this invention is to provide a new type of bonding procedure for cigarette and other tobacco smoke filters prepared from filter tows. Another object is to provide a bonding agent which is a sprayable liquid at ordinary temperatures without the addition of volatile solvents. A further object is to provide a bonding agent which is a nonvolatile liquid when applied to the surface of the filter tow but which cures to an insoluble solid at room temperatures or slightly above. Another object is to disclose a nonsolvent containing, sprayable, liquid bonding agent which is capable of producing firm or rigid filter rods from crimped tows of all types of filaments including polyamides, polyesters, polyolefins, glass, viscose, cotton, wool, cellulose esters, and the various acrylics. Other objects will appear hereinafter.

The new tobacco smoke filter bonding agents of this invention are unsaturated, polymerizable organic compounds with the following properties.

(1) They are high-boiling, sprayable and relatively nontacky liquids before and during the time they are applied to the filter tow. By using a high-boiling compound, the possibility of loss of a substantial amount of the bonding agent due to evaporation from the filter is eliminated. This property is particularly important in those instances wherein the filter is given a heat treatment.

(2) When properly catalyzed and sprayed on the filter tow, they slowly cure to an insoluble cement after the tow has been fabricated into a filter.

(3) Upon addition of a polymerization catalyst they remain a fluid for a considerable length of time in the equipment which feeds the fluid to the spray gun. This allows a continuous spraying operation on the modern filter rod machinery designed for continuous tows.

The compounds which meet these requirements are high-boiling liquids which contain polymerizable unsaturated carbon atoms within their structure. The presence of these unsaturated groups is of prime importance since it is through a polymerization mechanism that these applied liquids gradually cure to a hard cement. The formation of the cement, in turn, imparts the desired rigidity to the filter.

The following are illustrations of high-boiling unsaturated compounds suitable for the operation of this invention.

*I. Unsaturated ethers of sugars and sugar derivatives.*—Examples: Allyl ethers of sorbitol, sucrose, methylglucoside and mannitol.

*II. Unsaturated ethers of polyhydric alcohols.*—Examples: Allyl ethers of glycerol and pentaerythritol.

Included within the general classes listed above, it is understood that mixtures of these unsaturated compounds can be used. Also, mixed esters and ethers of polyol compound can be employed. Types of such compounds are given in U.S. Patent 2,541,142. Other references to unsaturated film forming compounds which are pertinent to the invention are as follows: JACS 67, 46 (1945), JACS 68, 2021 (1946), JACS 72, 1138 (1950), U.S. Patents 2,606,881 and 2,602,789. In the operation of this invention the known methods for catalyzing the polymerization of these compounds can be employed. Generally metal-type catalysts which promote air-oxidative polymerization of olefins were employed, particularly metal catalysts such as cobalt and manganese salts which are used with drying oils. The concentration of the catalyst will depend on its particular activity and the length of time the filter rod can be stored before being placed on cigarettes and packaged. The concentration of catalyst will also depend on whether the curing has been carried out at room temperature or at slightly elevated temperatures. In general, it is not necessary to use more than 1% catalyst based on the weight of the monomer. Usually a concentration of 0.02 to 0.2% catalyst is sufficient.

The time required for the filters to cure to a firm composition can be accelerated appreciably by the application of heat. However, it is not essential that heat be applied. Also, if it is desirable to use heat to accelerate the bonding time, only slightly elevated temperatures are required. Thus, for example, it is not necesary to heat the filters beyond 90° C. Usually, if heat is applied, a temperature of 40–70° C. is all that is required. At this temperature range the filters should become firm within 1 to 5 hours.

The amount of liquid bonding agent required to give a firm bond to the filter will depend on the type of compound or mixture of compounds being used and the spraying technique. Satisfactory results have been obtained with as low as 2% bonding agent based on the weight of the filter. Normally a concentration of 5–10% is employed. The application of excessive amounts of bonding agent, i.e. above 15%, should be avoided since this would have a tendency to bond the fibers into a fused, nonporous mass.

Inasmuch as the filter making apparatus which may be used in carrying out this invention, the manner of opening up the filter tow and the like may be substantially the same as described in the aforementioned Crawford and Stevens patents, extended description of such features herein is unnecessary.

However, for a further understanding of this invention reference is made to the attached drawing forming a part of the instant application. This drawing comprises a side elevation view of an arrangement of parts which may be used for carrying out the method claimed herein.

Referring in detail to this drawing, 20 is a package of the tow to be processed by the method of the present invention. A ball warp is indicated as the package but other packages as bales, boxes and the like may be used to provide the source of filaments to be processed by the herein described method. The bundle of filaments or tow 19 is withdrawn from the package and conducted through a fluffing or banding device 21 which spreads out the filaments as they enter spray booth 22.

In the spray booth the non-tacky monomeric liquid of the present invention which will air polymerize, such as an allyl ether of a polyol, is applied to the spread out filaments. The tow filaments thus treated are conducted into gathering device 23 and garniture 24 of filter rod former 29. Paper 26 or similar wrap is unrolled from supply 27 and conducted over roll 28 into the rod former device 29. The formed, wrapped filter rod then passes through cutter 30 where it is severed into the desired length.

A further understanding of our invention will be had from a consideration of the following examples which illustrate certain of our preferred embodiments.

*Example I.*—*Preparation of a firm filter from a crimped polyethylene tow using allyl sorbitol as the bonding agent*

Allyl sorbitol containing an average of 5 allyl groups per molecule was prepared by heating sorbitol with allyl bromide in the presence of aqueous NaOH. The procedure used was similar to that of Zief and Yanovsky, Ind. Eng. Chem. 41, 1697–1700 (1949). The product was a free flowing, pale yellow, nonvolatile liquid. A sample of this liquid containing 0.05% cobalt naphthenate was sprayed on both sides of a 30-foot length of crimped polyethylene (low density type) tow which had been spread out to a width of 12 inches. The tow consisted of 16,000 filaments of 3 denier per filament and contained 24 crimps per inch. Immediately after being sprayed, the tow was fed into a machine similar in design and operation to the filter rod machine described by Crawford and Stevens (U.S. 2,794,239). This machine compacted the tow into a bundle or rod, wrapped the rod with paper, and cut it into filter rods 90 mm. in length and 25.5 mm. in circumference. The rods contained 6 to 8% of the liquid bonding agent. When first prepared the rods were soft. However, after being stored for 12 hours at 75° F. they were quite rigid. One of the rods was placed in a 140° F. oven immediately after it was prepared. This rod became rigid in 30 minutes.

The cured rigid rods could be cut cleanly into 15-mm. lengths (filter tips) without being crushed or otherwise distorted. Smoking tests indicated that these filters removed 30% of the nicotine and 31% of the tars from the smoke of a standard cigarette. These tests were carried out in the manner described in the Touey British Patent 773,701, or Touey U.S. Patent No. 2,881,769. The cigarettes with the attached filters were 85 mm. in length and had an average pressure drop (resistance to draw) of 4.1 inches at an air flow rate of 17.5 ml. per second.

*Example II.*—*Preparation of a firm filter from a crimped tow of regenerated cellulose fibers using allyl sucrose as the bonding agent*

Allyl sucrose containing an average of 6.5 allyl groups per molecule was prepared in a manner similar to that referred to in Example I. A sample of this liquid containing 0.25% of manganese naphthenate was sprayed on both sides of a 30-foot length of crimped tow of rayon fibers (viscose) which has been spread out to a width of 12 inches. The tow consisted of 17,000 filaments of 5 denier per filament and contained 9 crimps per inch. Rods, 90 mm. in length and 25.5 mm. in circumference, were made from the tow immediately after it was sprayed using the equipment referred to in Example I. The rods containing 5% allyl sucrose, were soft when first prepared but became quite rigid after being stored overnight at 75° F. The cured rods could be cut cleanly into 15-mm. filter tips without producing any loose fibers protruding from the filters. Smoking tests indicated that these filters removed 22% of the tar and 21% of the nicotine from the smoke of a standard cigarette. The cigarettes with the attached filters were 85 mm. in length and had an average pressure drop of 3.9 inches at an air flow rate of 17.5 ml. per second.

It is believed that it may be seen from the above description and examples that we have provided a new bonded filter made up of various continuous crimped filaments, particularly filaments which may not be plasticized or which are not particularly compatible with plasticizers. However, the present invention will function with filaments which may be plasticized. The denier of these filaments is preferably less than 8 denier per filament and the crimp is preferably greater than 10 crimps per inch and may in the case of polyester filaments be of the order of 40 crimps per inch. One advantage of certain of these special polyester filaments is that they may be used at a very low denier of less than 3 and yet crimped to a very high degree without breakage of the filaments. It is further apparent from the above description that we have provided a large number of different polymerizable liquids which are not only noninjurious to the filaments, unobjectionable to the user of the filter, but which readily polymerize to a solid at room temperature thereby rendering the manufacture of the filter simple and economical.

The invention has been described in detail with particular reference to preferred embodiments thereof, but it will be understood that variations and modifications can be effected within the spirit and scope of the invention as described hereinabove and as defined in the appended claims.

We claim:
1. The method of making tobacco smoke filters from bundles of continuous crimped filaments from the group consisting of polyolefin and regenerated cellulose filaments which are not susceptible of bonding by plasticization which comprises spreading out a bundle of several thousand of said filaments into a band, treating the spread-out filaments with a nonvolatile, non-tacky monomeric liquid which will air polymerize, said non-tacky liquid being comprised of an allyl ether of a polyol and said liquid containing a metallic-oxidative polymerization catalyst, compacting the filaments, wrapping the circumference of the compacted filaments to form a continuous rod-like member, cutting the rod member into segments and heat curing the segments until said liquid polymerizes and thereby bonds the filaments at random zones of contact within the segment.

2. The method of making a filter element from a bundle of polyolefin crimped continuous filaments which are not susceptible of bonding by plasticization which comprises spreading out a bundle of several thousand of said crimped continuous polyolefin filaments into a band, treating the spread-out filaments with 2–15% of a liquid comprised of an allyl ether of a polyol, said liquid containing a metallic-oxidative polymerization catalyst, compacting the filaments, paper wrapping the circumference of the compacted filaments to form a continuous cylindrical rod, cutting the rod into segments and heat curing the segments until said liquid polymerizes and thereby bonds the filaments at random points of contact within the segment.

3. In a process of manufacturing filter elements from a bundle of continuous-crimped filaments which are not susceptible of bonding by plasticization, the procedure which includes opening up the bundle of such non-plasticizable filaments at one point of the process, adding a non-tacky air polymerizable allyl ether of a polyol nonvolatile liquid containing a metallic-oxidation polymerization catalyst to the opened up filaments, compacting and paper wrapping the filaments into the form of a rod, cutting the rod into segments and heat curing the segments until the nonvolatile liquid polymerizes and thereby bonds the filaments at random zones of contact.

4. A method in accordance with claim 3 wherein the allyl ether is allyl sucrose.

5. A method in accordance with claim 3 wherein the allyl ether is selected from the group consisting of allyl sorbitol and allyl mannitol.

References Cited by the Examiner

UNITED STATES PATENTS

| | | | |
|---|---|---|---|
| 2,476,582 | 7/1949 | Browne et al. | 154—90 |
| 2,541,142 | 2/1951 | Zief et al. | 260—234 |
| 2,585,035 | 2/1952 | Roach et al. | |
| 2,602,789 | 7/1952 | Schwartz et al. | 260—237 |
| 2,707,308 | 5/1955 | Taylor et al. | 154—90 |
| 2,774,680 | 12/1956 | Hackney et al. | |
| 2,794,480 | 7/1957 | Crawford et al. | |
| 2,805,671 | 9/1957 | Hackney et al. | 131—208 |
| 2,904,050 | 9/1959 | Kiefer et al. | 131—298 |
| 2,992,154 | 7/1961 | Mauthner et al. | |

OTHER REFERENCES

Natural and Synthetic High Polymers, by K. H. Meyer, 2nd ed., pub. 1950, page 173 (5 polymers from allyl alcohol and allyl esters).

Handbook of Plastics, Simonds, Weith and Bigelow, 2nd ed. pages 251–257, Allymer Columbia Resins, published 1949.

EARL M. BERGERT, *Primary Examiner.*

ABRAHAM G. STONE, CARL F. KRAFFT,
*Examiners.*